(12) United States Patent
Matsuda et al.

(10) Patent No.: US 8,201,603 B2
(45) Date of Patent: Jun. 19, 2012

(54) PNEUMATIC TIRE

(75) Inventors: Jun Matsuda, Hiratsuka (JP); Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 261 days.

(21) Appl. No.: 12/518,039

(22) PCT Filed: Oct. 29, 2007

(86) PCT No.: PCT/JP2007/071014
§ 371 (c)(1),
(2), (4) Date: Jun. 5, 2009

(87) PCT Pub. No.: WO2008/087776
PCT Pub. Date: Jul. 24, 2008

(65) Prior Publication Data
US 2010/0314020 A1 Dec. 16, 2010

(30) Foreign Application Priority Data

Jan. 15, 2007 (JP) .................................. 2007-005879

(51) Int. Cl.
*B60C 5/14* (2006.01)
(52) U.S. Cl. ....................................................... 152/510
(58) Field of Classification Search .................... 152/510
See application file for complete search history.

(56) References Cited

U.S. PATENT DOCUMENTS

| | | | |
|---|---|---|---|
| 2,939,503 A * | 6/1960 | Harris et al. | 152/510 |
| 4,627,479 A * | 12/1986 | Shurman et al. | 152/541 |
| 5,040,583 A | 8/1991 | Lin et al. | |
| 5,156,921 A | 10/1992 | Lin et al. | |
| 5,292,590 A | 3/1994 | Lin et al. | |
| 5,851,323 A * | 12/1998 | Kaido et al. | 152/510 |
| 6,913,053 B2 * | 7/2005 | Reep et al. | 152/554 |
| 2003/0024623 A1 * | 2/2003 | Miyazaki et al. | 152/557 |
| 2004/0074579 A1 * | 4/2004 | Nakakita et al. | 152/505 |
| 2007/0209744 A1 | 9/2007 | Matsumura | |
| 2009/0229726 A1 * | 9/2009 | Nakane et al. | 152/510 |
| 2009/0272485 A1 * | 11/2009 | Hata | 156/123 |

FOREIGN PATENT DOCUMENTS

JP     A 62-139705    6/1987

(Continued)

*Primary Examiner* — Khanh P Nguyen
*Assistant Examiner* — Vishal I Patel
(74) *Attorney, Agent, or Firm* — Greer, Burns & Crain, Ltd.

(57) ABSTRACT

Provided is a pneumatic tire: in which a film made of a thermoplastic resin or a thermoplastic elastomer composition obtained by blending an elastomer in a thermoplastic resin is used for an inner liner layer; and which is improved in its internal pressure holding performance while maintaining its durability satisfactorily. The pneumatic tire according to the present invention is a pneumatic tire in which: a carcass layer including multiple reinforcing cords is laid between paired bead parts; and the carcass layer is wound up around each of bead cores from the inner side to the outer side of the tire. In the pneumatic tire, an inner liner layer including a film made of the thermoplastic resin or the thermoplastic elastomer composition obtained by blending the elastomer in the thermoplastic resin is disposed on a tire inner cavity side of the carcass layer, the inner liner layer is wound up around each bead core from the inner side to the outer side of the tire, and the winding-up height (L-TUH) of the inner liner layer is set at 25% or more of the sectional height (SH) of the tire.

6 Claims, 1 Drawing Sheet

FOREIGN PATENT DOCUMENTS

| | | |
|---|---|---|
| JP | A 1-314164 | 12/1989 |
| JP | A 10-81108 | 3/1998 |
| JP | A 11-123907 | 5/1999 |
| JP | A 11-320705 | 11/1999 |
| JP | A 2000-190713 | 7/2000 |
| JP | A 2005-75010 | 3/2005 |
| WO | WO 2005/097522 A1 | 10/2005 |

* cited by examiner

PNEUMATIC TIRE

This application is a U.S. National Phase under 35 U.S.C. §371 of International Application No. PCT/JP2007/071014, filed Oct. 29, 2007.

TECHNICAL FIELD

The present invention relates to a pneumatic tire using, in an inner liner layer, a film made of a thermoplastic resin or a thermoplastic elastomer composition obtained by blending an elastomer in a thermoplastic resin. More specifically, the present invention relates to a pneumatic tire which is improved in its internal pressure holding performance while maintaining its durability satisfactorily.

BACKGROUND ART

Conventional practices for preventing air from leaking from a pneumatic radial tire including at least one carcass layer include to increase the thickness of an inner liner layer which is disposed in the innermost surface of the tire, or to use a material with a smaller air permeability coefficient for the inner liner layer. However, in a case where the inner liner layer is made thicker, the tire weighs heavier, and the rolling resistance of the tire worsens. Meanwhile, in a case where a material with a smaller air permeability coefficient is used for the inner liner layer (see Patent Document 1, for example), it is possible to prevent air from leaking from the tire without increasing the weight of the tire. However, once air having permeated the inner liner layer reaches the carcass layer, the air quickly propagates to the wound-up portions of the carcass layer, and leaks out from the wound-up portions to the outer surface of the tire. Generally speaking, that is because the air permeability coefficient of the carcass cords which are twisted cords is extremely larger than that of any rubber composition.

With this taken into consideration, for the purpose of effectively improving the internal pressure holding performance, it is effective to dispose a material having a smaller air permeability coefficient in the sidewall parts largely contributory to air leakage. As a concrete scheme, there has been proposed that an air permeation prevention layer made of a rubber composition mainly containing polyisobutylene isoprene rubber should be provided in the sidewall parts (see Patent Document 2, for example). However, the adhesiveness between polyisobutylene isoprene rubber and a diene rubber generally used for the sidewall parts is poor, and therefore, the disposition of the air permeation prevention layer made of the rubber composition mainly containing the polyisobutylene isoprene rubber in the sidewall parts, where large deformation of bending occurs, causes a serious problem from a viewpoint of the durability of the tire.

In addition, there have been proposed a structure in which a material having a smaller air permeability coefficient is disposed between the carcass layer and a reinforcement member such as a chafer in each bead part (see Cited Document 3, for example), and a structure in which the inner liner layer is disposed in a way that a part of the inner liner layer is folded back to reach a position below each bead core (see Patent Document 4, for example). However, even when these structures are used, it is still difficult to prevent air from leaking out from each wound-up portion of the carcass layer to the outer surface of the tire. In addition, the problem with the adhesiveness between the air permeation prevention layer made of the rubber composition mainly containing the polyisobutylene isoprene rubber and its surrounding rubber layer remains yet to be solved.

Patent Document 1: Japanese patent application Kokai publication No. Hei. 11-123907
Patent Document 2: Japanese patent application Kokai publication No. 2000-190713
Patent Document 3: Japanese patent application Kokai publication No. Sho. 62-139705
Patent Document 4: Japanese patent application Kokai publication No. Hei. 11-320705

DISCLOSURE OF THE INVENTION

Problem to be Solved by the Invention

An object of the present invention is to provide a pneumatic tire: whose inner liner layer is formed of a film made of a thermoplastic resin or a thermoplastic elastomer composition obtained by blending an elastomer in a thermoplastic resin; and which is improved in its internal pressure holding performance while maintaining its durability satisfactorily.

Means for Solving the Problem

A pneumatic tire according to the present invention made for the purpose of attaining the above-described object is a pneumatic tire in which: a carcass layer including a plurality of reinforcing cords is laid between paired bead parts; and the carcass layer is wound up around each of bead cores from an inner side to an outer side of the tire. The pneumatic tire is characterized in that an inner liner layer including a film made of a thermoplastic resin or a thermoplastic elastomer composition obtained by blending an elastomer in a thermoplastic resin is disposed on a tire inner cavity side of the carcass layer, the inner liner layer is wound up around each bead core from the inner side to the outer side of the tire, and a winding-up height (L-TUH) of the inner liner layer is set at 25% or more of a sectional height (SH) of the tire.

Effects of the Invention

The present invention makes it possible to prevent effectively prevent air having propagated to each wound-up portion of the carcass layer from leaking out to the outer surface of the tire by performing the following: the inner liner layer including the film made of the thermoplastic resin or the thermoplastic elastomer composition obtained by blending the elastomer in the thermoplastic resin is disposed on the tire inner cavity side of the carcass layer; the inner liner layer is wound up around each bead core from the inner side to the outer side of the tire; and the winding-up height (L-TUH) of the inner liner layer is set at 25% or more of the sectional height (SH) of the tire. In addition, the present invention prevents the durability of the tire from deteriorating because the adhesiveness between the rubber composition and the film made of the thermoplastic resin or the thermoplastic elastomer composition obtained by blending the elastomer in the thermoplastic resin is fine. Accordingly, the present invention makes it possible to improve the internal pressure holding performance of the tire can be improved while the durability of the tire is satisfactorily maintained.

In the present invention, the location of each end of the carcass layer and the location of a corresponding end of the inner liner layer should preferably be separated away from each other by 5 mm or more in the radial direction of the tire.

This makes it possible to prevent edge separation from occurring from the location of each end of the carcass layer and from the location of the corresponding end of the inner liner layer.

The inner liner layer preferably has a structure in which the film is sandwiched between paired rubber sheets. In particular, each rubber sheet is preferably made of a rubber composition containing a rubber component in which the amount of blended polyisobutylene isoprene rubber is limited to 50% by weight or less. This makes it possible to further improve the adhesiveness between the inner liner layer including the film and the surrounding rubber layer.

EXPLANATION OF REFERENCE NUMERALS

| | |
|---|---|
| 1 | tread part |
| 2 | sidewall part |
| 3 | bead part |
| 4 | carcass layer |
| 4e | location of an end of the carcass layer |
| 5 | bead core |
| 6 | belt layer |
| 7 | inner liner layer |
| 7e | location of an end of the inner liner layer |
| 11 | film |
| 12, 13 | rubber sheet |

BEST MODE FOR CARRYING OUT THE INVENTION

Figure 1:
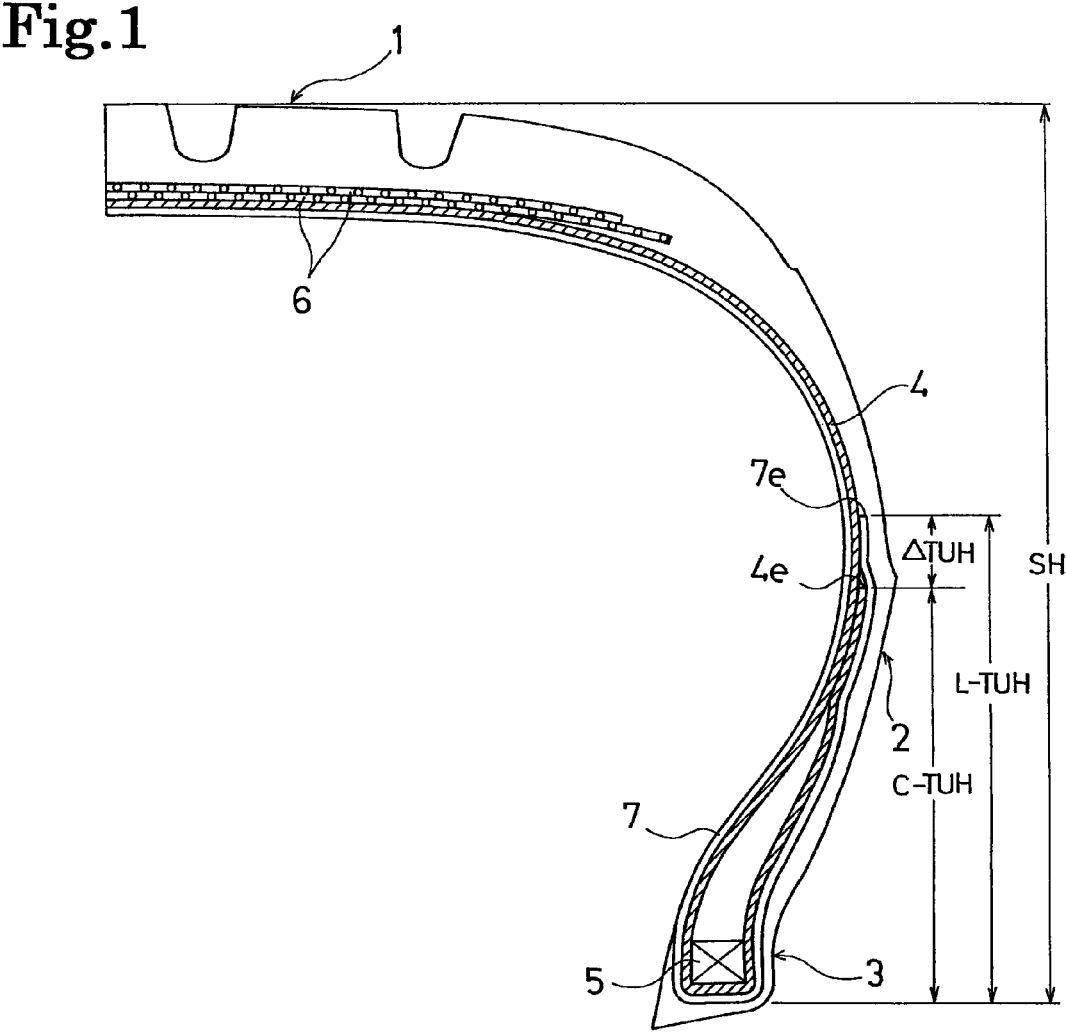
FIG. 1 is a meridian half cross-sectional view showing a pneumatic tire according to an embodiment of the present invention.

Hereinbelow, the configuration of the present invention will be described in detail by referring to the attached drawings. FIG. 1 shows a pneumatic tire according to an embodiment of the present invention. Reference numeral 1 denotes a tread part; 2, a sidewall part; and 3, a bead part. A carcass layer 4 including multiple reinforcing cords is laid between paired left and right bead parts 3, 3. The carcass layer 4 is wound up around each bead core 5 from the inner side to the outer side of the tire. In general, an organic fiber cord such as a nylon cord or a polyester cord is used as the reinforcing cords included in the carcass layer 4. Multiple belt layers 6 are embedded in a portion of the tread part 1, which is located on the outer circumferential side of the carcass layer 4. These belt layers 6 are disposed in a way that: the reinforcing cords tilt in the circumferential direction of the tire and cross over with each other in its neighboring belt layer 6.

Figure 2:
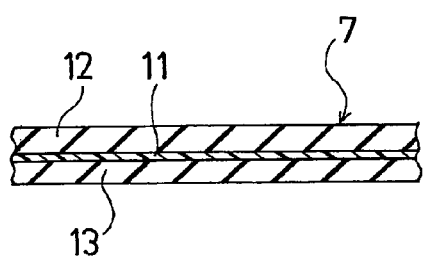
FIG. 2 is a magnified cross-sectional view of an inner liner layer according to the present invention.

In the pneumatic tire, an inner liner layer 7 is disposed on the tire cavity side of the carcass layer 4. As shown in the magnified cross-sectional view of FIG. 2, this inner liner layer 7 is configured of: a film 11 made of a thermoplastic resin or a thermoplastic elastomer composition; and rubber sheets 12, 13 laid on the respective two sides of the film 11. The inner liner layer 7 needs to include the film 11. However, the inner liner layer 7 may have a structure in which a rubber sheet is laid on one side of the film only. Otherwise, the inner liner 7 may include the film only.

Like the carcass layer 4, the inner liner layer 7 is wound up around each bead core 5 from the inner side to the outer side of the tire. In addition, the winding-up height (L-TUH) of the inner liner layer 7 is set at 25% or more, preferably 30% to 50%, of the sectional height (SH) of the tire.

The pneumatic tire configured in the above-described manner is capable of effectively preventing air having propagated to each wound-up portion of the carcass layer 4 from leaking out to the outer surface of the tire, even in a case where the air permeates the inner liner layer 7, subsequently reaches the carcass layer 4, thereafter passes along the reinforcing cords included in the carcass layer 4, and eventually propagates to each wound-up portion of the carcass layer 4. That is because the winding-up height (L-TUH) of the inner liner layer 7 including the film 11 is set at 25% or more of the sectional height (SH) of the tire. However, when the winding-up height (L-TUH) of the inner liner layer 7 is less than 25% of the sectional height (SH) of the tire, the effect of preventing air from leaking in a vicinity of each wound-up portion of the carcass layer 4 is insufficient. Furthermore, the durability of the tire does not deteriorate because the film 11 made of the thermoplastic resin or the thermoplastic elastomer composition has a fine mutual adhesiveness to the rubber composition. Consequently, the internal pressure holding performance can be improved while the durability is satisfactorily maintained, in comparison with a pneumatic tire of a conventional type including an inner liner layer made of a rubber composition mainly containing polyisobutylene isoprene rubber.

In the aforementioned pneumatic tire, it is desirable that the location 4e of each end of the carcass layer 4 and the location 7e of its corresponding end of the inner liner layer 7 should be separated away from each other by 5 mm or more. In other words, it is desirable that, in FIG. 1, the difference ($\Delta$TUH) between the winding-up height (C-TUH) of the carcass layer 4 and the winding-up height (L-TUH) of the inner liner layer 7 should satisfy a relation expressed by $\Delta\text{TUH}=|(\text{L-TUH})-(\text{C-TUH})|\geq 5$ mm. Through the mutual relationship, the durability of the tire can be improved while edge separation is prevented from occurring from the location 4e of each end of the carcass layer 4 and the location 7e of each end of inner liner layer 7.

It is most desirable that the inner liner layer 7 should have a sandwich structure in which the film 11 is sandwiched between paired rubber sheets 12, 13. In particular, it is desirable that the rubber composition forming the rubber sheets 12, 13 should contain a rubber component in which the amount of blended polyisobutylene isoprene rubber is limited to 50% by weight or less. It is needless to say that a rubber composition containing no polyisobutylene isoprene rubber is the most suitable. Through this blending scheme, adhesiveness between the inner liner layer 7 including the film 11 and the surrounding rubber layer can be further improved. When the amount of polyisobutylene isoprene rubber blended in the rubber component exceeds 50% by weight, the adhesiveness between the inner liner layer 7 and the surrounding rubber layer becomes insufficient.

No specific restriction is imposed on the thickness of the film 11. However, the thickness of the film 11 may be selected from a range of 0.001 mm to 0.300 mm. By contrast, it is desirable that the thickness of each of the rubber sheets 12, 13 laid on the respective two sides of the film 11 should be 0.10 mm to 0.70 mm. Excessive thickness leads to increase in weight.

Hereinbelow, the film used in the present invention will be described. This film may be made of a thermoplastic resin or a thermoplastic elastomer composition obtained by blending an elastomer in a thermoplastic resin.

Examples of the thermoplastic resin used in the present invention include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon Jun. 66, 19610 copolymers (N6/66/610), nylon MXD6, nylon 6T, nylon 6/6T copolymers, nylon 66/PP copolymers, and nylon 66/PPS copolymers); polyester resins (for example, aromatic polyesters such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), methacrylonitrile/styrene copolymers, and methacrylonitrile/styrene/butadiene copolymers); poly(meth)acrylate resins (for example, polymethyl methacrylate (PMMA), polyethyl methacrylate, ethylene etylacrylate copolymers (EEA), ethylene acrylic acid copolymers (EAA), and ethylene-methyl acrylate resin (EMA)); polyvinyl resins (for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methyl acrylate copolymers); cellulose resins (for example, cellulose acetate, cellulose acetate butyrate); fluororesins (for example, polyvinylidene fluoride (PVDF), polyvinyl fluoride (PVF), polychlorotrifluoroethylene (PCTFE), and tetrafluoroethylene/ethylene copolymers (ETFE)); imide resins (for example, aromatic polyimide (PI)); and the like.

Examples of the elastomer used in the present invention include: diene rubbers and their hydrogenated products (for example, NR, IR, epoxidized natural rubbers, SBR, BR (high-cis BR and low-cis BR), NBR, hydrogenated NBR, and hydrogenated SBR); olefin rubbers (for example, ethylene propylene rubbers (EPDM and EPM), maleic acid-modified ethylene propylene rubber (M-EPM)); polyisobutylene isoprene rubber (IIR); copolymers of isobutylene and aromatic vinyl or diene monomer; acrylic rubber (ACM); ionomers; halogen-containing rubbers (for example, Br-IIR, Cl-IIR, brominated isobutylene para-methylstyrene copolymers (Br-IPMS), chloroprene rubber (CR), hydrin rubbers (CHC and CHR), chlorosulfonated polyethylene (CSM), chlorinated polyethylene (CM), and maleic acid-modified chlorinated polyethylene (M-CM)); silicone rubbers (for example, methyl vinyl silicone rubber, dimethyl silicone rubber, and methylphenylvinyl silicone rubber)); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); thermoplastic elastomers (for example, styrene elastomers, olefin elastomers, polyester elastomers, urethane elastomers, and polyamide elastomers); and the like.

With regard to the thermoplastic elastomer composition used in the present invention, the composition ratio of the thermoplastic resin component (A) to the elastomer component (B) may be determined by taking into consideration the balance between the thickness and flexibility of the film as appropriate. A range is preferably from 10/90 to 90/10, and more preferably from 20/80 to 85/15 in weight ratio.

As to the thermoplastic elastomer composition according to the present invention, as third components, another polymer such as a compatibilizer and compounding agents may be mixed with the above essential components (A), (B). The purposes of mixing such other polymers include: improving the compatibility between the thermoplastic resin component and the elastomer component; enhancing the processability with which the material is molded into the film; improving the heat resistance; and reducing costs. Examples of the material used for this include polyethylene, polypropylene, polystyrene, ABS, SBS, and polycarbonate.

The aforementioned thermoplastic elastomer composition is obtained by beforehand melt-kneading the thermoplastic resin and the elastomer (remaining unvalcanized in a case where the elastomer is a rubber) by use of a biaxial kneader/extruder or the like, and thereby dispersing the elastomer component in the thermoplastic resin forming continuous phases. When the elastomer component is cured, the elastomer may be dynamically vulcanized by adding a vulcanizer while kneaded. Although various compounding agents (except for the vulcanizer) may be added to the thermoplastic resin or the elastomer component during the kneading process, it is desirable that the compounding agents should be beforehand mixed together before the kneading process. No specific restriction is imposed on the kneader used to knead the thermoplastic resin and the elastomer. For example, a screw extruder, a kneader, a Banbury mixer, a biaxial kneader/extruder can be used as the kneader. Out of these machines, the biaxial kneader/extruder is preferably used to knead the resin component and the rubber component, and to dynamically vulcanize the rubber component. Furthermore, two or more types of kneaders may be used to successively knead the resin component and the rubber component. As the condition for the melt-kneading, the temperature is preferably equal to or higher than a temperature at which the thermoplastic resin starts to melt. Moreover, the shear rate during the kneading process is preferably 2500 $\sec^{-1}$ to 7500 $\sec^{-1}$. The total kneading time is preferably 30 seconds to 10 minutes. When the vulcanizer is added, the vulcanization time after the addition is preferably 15 seconds to 5 minutes. The thermoplastic elastomer composition produced by the above-described method is molded into the film by use of a resin extruder or a calendar. The thermoplastic elastomer composition thus produced may be molded into the film in accordance with a generally-used method for forming a thermoplastic resin or a thermoplastic elastomer into a film.

The thus-obtained thin film made of the thermoplastic elastomer composition has a structure in which as discontinuous phases, the elastomer is dispersed in the matrix of the thermoplastic resin. Because the thin film has the thus-conditioned dispersion structure, the Young's modulus of elasticity of the thin film can be set in a range of 1 MPa to 500 MPa. This makes it possible to impart a suitable rigidity to the thin film as a component member of the tire.

The thermoplastic resin or the thermoplastic elastomer composition is molded into a sheet or film. The resultant sheet or film may be singly embedded in the inside of the tire. Otherwise, an adhesive layer may be laid on each of the two sides of the sheet or film in order to increase the mutual adhesiveness with the adjacent rubber. Specific examples of an adhesive polymer constituting this adhesive layer include: ultra-high molecular weight polyethylene (UHMWPE) having a molecular weight of one million or more, more desirably, three million or more; acrylate copolymers such as ethylene etylacrylate copolymers (EEA), ethylene-methyl acrylate resins (EMA), and ethylene acrylic acid copolymers (EAA); maleic anhydride products of acrylate copolymers; polypropylene (PP) and its maleic acid-modified products; ethylene propylene copolymers and their maleic acid-modified products; polybutadiene resins and their maleic anhydride-modified products; styrene-butadiene-styrene copolymers (SBS); styrene-ethylene-butadiene-styrene copolymers (SEBS); thermoplastic fluororesins; thermoplastic polyester resins, and the like. These can be molded into a sheet or film, for example, by extruding the adhesive polymers by use of a resin extruder in accordance with an ordinary method. No specific restriction is imposed on the thickness of each adhesive layer. However, it is better that each adhesive layer should be formed thinner for the purpose of reducing the weight of the tire. The thickness is preferably 5 μm to 150 μm.

The preferred embodiment of the present invention has been described in detail. However, it shall be understood that the preferred embodiment can be variously modified, substituted and replaced within the scope not departing from the spirit or scope of the present invention as defined by the appended scope of claims.

EXAMPLES

Pneumatic tires with the following common specification were produced for Conventional Example, Examples 1 to 4, and Comparative Examples 1 to 2 by variously changing: materials constituting the inner liner layer disposed on the tire inner cavity side of the carcass layer; a ratio (L-TUH/SH) of the winding-up height (L-TUH) of the inner liner layer to the sectional height (SH) of the tire; and the difference (ΔTUH) between the winding-up height (C-TUH) of the carcass layer and the winding-up height (L-TUH) of the inner liner layer. The common specification was as follows. The tire size was 195/60R15. The carcass layer including the multiple reinforcing cords was laid between the paired bead parts. The carcass layer was wound up around each bead core from the inner side to the outer side of the tire.

The tire according to Conventional Example used a 0.5-mm-thick inner liner layer made of the rubber composition mainly containing polyisobutylene isoprene rubber, and two end portions of the inner liner layer thereof were terminated in the inner side of the tire. The tire according to each of Examples 1 to 3 used a 0.5-mm-thick inner liner layer having a sandwich structure in which a film made of a thermoplastic elastomer composition obtained by blending an elastomer in a thermoplastic resin was sandwiched between the paired rubber sheets, and the inner liner layer was wound up around each bead core from the inner side to the outer side of the tire. The thermoplastic elastomer composition was obtained by blending a halogen-containing rubber (bromated polyisobutylene isoprene rubber) in a polyamide resin (nylon 6, 66). The tire according to each of Example 4 and Comparative Example 1 used a 0.4-mm-thick inner liner layer having a sandwich structure in which a film made of a vinyl alcohol/ethylene copolymer (EVOH) was sandwiched between the paired rubber sheets, and the inner liner layer was wound up around each bead core from the inner side of the outer side of the tire. The tire according to Comparative Example 2 used a 0.5-mm-thick inner liner layer made of the rubber composition mainly containing polyisobutylene isoprene rubber, and the inner liner layer was wound up around each bead core from the inner side to the outer side of the tire.

Table 1 shows the degrees of air permeability of the respective inner liner layers by indices based on an index of 100 set for Conventional Example, by using the inverse number of the air permeability which was measured in accordance with JIS K7126 "testing method for gas transmission rate through plastic film and sheeting (Method A)." A larger index number means a better resistance to air permeation.

For the tire according to each of Conventional Example, Examples 1 to 4 and Comparative Examples 1 to 2 which have been described, the internal pressure holding performance and durability were evaluated in accordance with the respective evaluation methods which will be described below. The results of the evaluation are shown in Table 1.

Internal Pressure Holding Performance:

Each test tire was mounted on a standard rim. Thereafter, each tire thus mounted was left for three months at a 250-kPa initial pressure, at a room temperature of 21° C. and with no load imposed on the test tire. The internal pressure of each tire was measured every three hours. For each tire, a value α was obtained by regression analysis from an equation expressed by $$Pt/P0 = \exp(-\alpha t)$$

where Pt denotes the measured internal pressure, P0 denotes the initial pressure, and t denotes the number of elapsed days.

By use of the thus-obtained value α, a value β was obtained from an equation expressed by $$\beta = [1 - \exp(-\alpha t)] \times 100$$

by substituting t=30 (days). The thus-obtained value β was defined as a rate of internal pressure reduction per month (%/month). The evaluation results are shown by indices based on an index of 100 set for Conventional Example, by using the inverse number of the rate of inner pressure reduction. A larger index number means a better internal pressure holding performance.

Durability:

Each test tire was mounted on a standard rim, and was inflated with a standard air pressure. Thereafter, each resultant test tire was caused to run on a drum at a speed of 80 km/h with a maximum load corresponding to the air pressure being imposed on the tire (see "Correspondence Table of Air Pressures and Load Carrying Capacities" in JATMA Year Book). For each test tire, this run test was terminated once a damage observable by visible inspection of the external appearance occurred on the tire, and the distance that the tire had traveled until the damage occurred was obtained. The evaluation results are shown by indices based on an index of 100 set for Conventional Example. A larger index number means better durability.

TABLE 1

| | Conventional Example | Example 1 | Example 2 | Example 3 | Example 4 | Comparative Example 1 | Comparative Example 2 |
|---|---|---|---|---|---|---|---|
| Material of Inner Liner Layer | Polyisobutylene isoprene rubber | Sandwich Structure Thermoplastic Elastomer | Sandwich Structure Thermoplastic Elastomer | Sandwich Structure Thermoplastic Elastomer | Sandwich Structure EVOH | Sandwich Structure EVOH | Polyisobutylene isoprene rubber |
| Air Permeability of Liner (Index) | 100 | 100 | 100 | 150 | 150 | 100 | 100 |
| L-TUH/SH | — | 0.25 | 0.50 | 0.30 | 0.50 | 0.20 | 0.50 |
| ΔTUH (mm) | — | −16 | 15 | −10 | 15 | −22 | 15 |
| Internal | 100 | 110 | 120 | 178 | 190 | 105 | 118 |

TABLE 1-continued

| | Conventional Example | Example 1 | Example 2 | Example 3 | Example 4 | Comparative Example 1 | Comparative Example 2 |
|---|---|---|---|---|---|---|---|
| Pressure Holding Performance (Index) | | | | | | | |
| Durability (Index) | 100 | 130 | 150 | 205 | 210 | 100 | 80 |

As clear from Table 1, each of the tires according to Examples 1 to 4 was improved in the internal pressure holding performance while maintaining satisfactorily, in comparison with the tire according to Conventional Example. By contrast, the tire according to Comparative Example 1 exhibited an insufficient effect of improving the internal pressure holding performance, because the winding-up height (L-TUH) of the inner liner layer was insufficient. The tire according to Comparative Example 2 exhibited a remarkably reduced durability, because the winding-up height (L-TUH) of the inner liner layer made of the rubber composition mainly containing polyisobutylene isoprene rubber was set higher.

What is claimed is:

1. A pneumatic tire comprising:
    a carcass layer including a plurality of reinforcing cords laid between paired bead parts, the carcass layer being wound up around each of bead cores from an inner side to an outer side of the tire; and
    an inner liner layer including a film made of any one of a thermoplastic resin and a thermoplastic elastomer composition obtained by blending an elastomer in a thermoplastic resin, the inner liner layer being disposed on a tire inner cavity side of the carcass layer,
    wherein the inner liner layer extends from at least a tread portion of the tire and is wound up around each of the bead cores from the inner side to the outer side of the tire, and
    a winding-up height (L-TUH) of the inner liner layer is set at 30% to 50% of a sectional height (SH) of the tire.

2. The pneumatic tire according to claim 1, wherein a location of each end of the carcass layer and a location of a corresponding end of the inner liner layer are separated away from each other by 5 mm or more in a radial direction of the tire.

3. The pneumatic tire according to claim 1, wherein the inner liner layer has a structure in which the film is sandwiched between paired rubber sheets.

4. The pneumatic tire according to claim 2, wherein the inner liner layer has a structure in which the film is sandwiched between paired rubber sheets.

5. The pneumatic tire according to claim 3, wherein each rubber sheet is made of a rubber composition in which an amount of blended polyisobutylene isoprene rubber in a rubber component is limited to not more than 50% by weight.

6. The pneumatic tire according to claim 4, wherein each rubber sheet is made of a rubber composition in which an amount of blended polyisobutylene isoprene rubber in a rubber component is limited to not more than 50% by weight.

* * * * *